United States Patent
Suzuki

(10) Patent No.: US 9,778,764 B2
(45) Date of Patent: Oct. 3, 2017

(54) INPUT DEVICE

(71) Applicant: DENSO CORPORATION, Kariya, Aichi-pref. (JP)

(72) Inventor: Tsuyoshi Suzuki, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 60 days.

(21) Appl. No.: 14/780,984

(22) PCT Filed: Mar. 27, 2014

(86) PCT No.: PCT/JP2014/001777
§ 371 (c)(1),
(2) Date: Sep. 28, 2015

(87) PCT Pub. No.: WO2014/162699
PCT Pub. Date: Oct. 9, 2014

(65) Prior Publication Data
US 2016/0054822 A1    Feb. 25, 2016

(30) Foreign Application Priority Data

Apr. 3, 2013   (JP) ................................ 2013-077849

(51) Int. Cl.
*G06F 3/041* (2006.01)
*G06F 3/0354* (2013.01)
(Continued)

(52) U.S. Cl.
CPC .......... *G06F 3/03547* (2013.01); *B60K 35/00* (2013.01); *G01C 21/3664* (2013.01);
(Continued)

(58) Field of Classification Search
USPC ........... 345/157, 173, 175, 428, 8, 156, 174; 386/234
See application file for complete search history.

(56) References Cited

U.S. PATENT DOCUMENTS 6,198,475 B1   3/2001   Kunimatsu et al.
6,655,581 B1   12/2003  Takishima et al.
(Continued)

FOREIGN PATENT DOCUMENTS

JP   H02240715 A   9/1990
JP   2000194502 A  7/2000
(Continued)

OTHER PUBLICATIONS

International Search Report and Written Opinion (in Japanese with English Translation) for PCT/JP2014/001777, mailed Apr. 22, 2014; ISA/JP.

*Primary Examiner* — Thuy Pardo
(74) *Attorney, Agent, or Firm* — Harness, Dickey & Pierce, P.L.C.

(57) ABSTRACT

An input device mounted in a vehicle, separated from a display unit and configured to input a finger operation to an operation surface to operate an image of the display unit is provided. The input device includes a detector that detects presence and absence of a finger in a groove, and controller that prohibits an input of a finger operation to an operation surface when a finger operation to the operation surface has not been performed for a predetermined time or longer and that cancels the prohibition of the input when determining the presence of sliding of the finger in the groove based on detection of the finger in the groove by the detector.

9 Claims, 11 Drawing Sheets

(51) Int. Cl.
   *G01C 21/36*   (2006.01)
   *B60K 35/00*   (2006.01)
   *G06F 3/0488*  (2013.01)
   *G06F 1/16*    (2006.01)

(52) U.S. Cl.
   CPC ......... *G01C 21/3688* (2013.01); *G06F 1/169* (2013.01); *G06F 3/041* (2013.01); *G06F 3/0416* (2013.01); *G06F 3/0488* (2013.01); *G06F 3/04886* (2013.01); *G06F 2203/04106* (2013.01); *G06F 2203/04108* (2013.01)

(56) References Cited

U.S. PATENT DOCUMENTS

| | | | |
|---|---|---|---|
| 7,129,933 | B1 | 10/2006 | Nishikawa et al. |
| 2006/0279554 | A1 | 12/2006 | Shin et al. |
| 2011/0098019 | A1 | 4/2011 | Fujii |
| 2011/0128164 | A1 | 6/2011 | Kang et al. |
| 2013/0009900 | A1* | 1/2013 | Pryor ............... B60K 35/00 345/173 |
| 2013/0106693 | A1* | 5/2013 | Okuyama ........... G06F 3/0482 345/157 |
| 2013/0141395 | A1* | 6/2013 | Holmgren ........... G06F 3/0421 345/175 |
| 2014/0098052 | A1 | 4/2014 | Fujii |
| 2014/0139422 | A1* | 5/2014 | Mistry ................. G06F 3/014 345/156 |
| 2014/0139454 | A1* | 5/2014 | Mistry ................. G06F 3/041 345/173 |
| 2014/0267282 | A1* | 9/2014 | Ren ..................... G01C 21/00 345/428 |
| 2015/0145834 | A1* | 5/2015 | Holmgren ........... G06F 3/0421 345/175 |
| 2015/0153894 | A1* | 6/2015 | Rawls-Meehan .... A47C 20/041 345/173 |
| 2015/0205943 | A1 | 7/2015 | Takenaka et al. |
| 2015/0215676 | A1* | 7/2015 | Chow ................. G06F 3/0482 386/234 |
| 2015/0309316 | A1* | 10/2015 | Osterhout ............ G06F 1/163 345/8 |

FOREIGN PATENT DOCUMENTS

| | | |
|---|---|---|
| JP | 2000353269 A | 12/2000 |
| JP | 2008541222 A | 11/2008 |
| JP | 2010013081 A | 1/2010 |
| JP | 2010061256 A | 3/2010 |
| JP | 2011097128 A | 5/2011 |
| JP | 2011118857 A | 6/2011 |
| JP | 2012073721 A | 4/2012 |
| JP | 2012247890 A | 12/2012 |
| WO | WO-2014030352 A1 | 2/2014 |
| WO | WO-2014162697 A1 | 10/2014 |
| WO | WO-2014162698 A1 | 10/2014 |

* cited by examiner

| | SENSING TH (COUNT) | OPERATION STATE | SCREEN |
|---|---|---|---|
| Hth1 | 200 | CONTACT | CONTACT |
| Hth2 | 100 | NON-CONTACT | NON-CONTACT |

FIG. 9

| STATE | LOCKED STATE (WRONG OPERATION PREVENTION MODE) | LOCK CANCELLED |
|---|---|---|
| SCREEN | EXAMPLE OF LOCKED STATE DISPLAY | EXAMPLE OF OPERATION SCREEN DISPLAY |
| OPERATION | OPERATING PAD SURFACE DIRECTLY | TRACING POINTS A→B IN GROOVE (LOCK CANCEL SENSOR) AND THEN OPERATING PAD SURFACE |

FIG. 13

| STATE | SCREEN | OPERATION |
|---|---|---|
| OPERATION IN P-SEAT | P-SEAT DEDICATED DISPLAY 60, 60b — Climate for Passenger — TILTED 53 | OPERATING P-SEAT (LEFT) GROOVE |
| OPERATION IN D-SEAT | D-SEAT DEDICATED DISPLAY 60, 60a — Climate for Driver — TILTED 53 | OPERATING D-SEAT (RIGHT) GROOVE |

FIG. 17

| STATE | NAVI OPERATION | AUDIO OPERATION | A/C OPERATION |
|---|---|---|---|
| SCREEN | NAVI SCREEN 61 60, 601 | AUDIO SCREEN 60, 602 61 | A/C SCREEN 61 60, 603 |
| OPERATION | OPERATING MODE (LEFT) GROOVE 331 332 333 / 32 | OPERATING AUDIO (CENTER) GROOVE 332 333 / 331 / 32 | OPERATING A/C (RIGHT) GROOVE 333 / 332 / 331 / 32 |

INPUT DEVICE

CROSS REFERENCE TO RELATED APPLICATIONS

This application is a U.S. National Phase Application under 35 U.S.C. 371 of International Application No. PCT/JP2014/001777 filed on Mar. 27, 2014 and published in Japanese as WO 2014/162699 A1 on Oct. 9, 2014. This application is based on and claims the benefit of priority from Japanese Patent Application No. 2013-077849 filed on Apr. 3, 2013. The entire disclosures of all of the above applications are incorporated herein by reference.

TECHNICAL FIELD

The present disclosure relates to an input device for inputting an operator's finger operation for an information display in a display unit.

BACKGROUND ART

For example, Patent Literature 1 discloses a conventional input device. The input device (an operational user-interface device) disclosed by Patent Literature 1 includes a remote touchpad unit for a user to perform a touch operation, a display unit to display a multimedia system of various modes according to three-dimensional signals received from the remote touchpad unit, and a controller to control the operation of the multimedia system according to the three-dimensional signals of the remote touchpad unit.

In the input device disclosed by Patent Literature 1, when the position of a user's finger is located in a range of a first height from the surface of the remote touchpad unit, the position of the finger (pointer) is displayed on the display unit to enable a detailed operation through the movement of the pointer and the movement of a menu.

When the position of the user's finger is located in the range from the first height to a second height, switching between a first mode and a second mode is enabled by a wipe pass gesture, and movement among a home, a main, and a sub screen is also enabled.

When the position of the user's finger is located in the range from the second height to a third height, switching to an operation standby screen is enabled in a radio main screen.

PRIOR ART LITERATURES

Patent Literature

Patent Literature 1: JP-2011-118857 A

SUMMARY OF INVENTION

According to studies by the inventor of the present application, however, since the above-described screen operation is performed depending on the distance (height) from the surface of the remote touchpad to a finger, when a finger (hand) is brought close to the remote touchpad accidentally, there is a possibility that an unintended input (wrong operation) is performed to the display on the display unit.

In view of the foregoing, it is an object of the present disclosure to provide an input device which can prevent an input unintended by a user.

An input device according to an example of the present disclosure adopts the following configurations.

The input device is mounted in a vehicle, separated from a display unit that switchably displays images hierarchized in a plurality of hierarchy levels, and configured to input a user's finger operation to an operation surface to operate the images. The input device comprises a groove defined by a depressed area extending in a longitudinal direction of the groove to enable a user's fingertip inserted in the groove to be slid in the longitudinal direction, a detector that detects presence and absence of the finger in the groove, and a controller that prohibits an input of the finger operation to the operation surface when the finger operation to the operation surface has not been performed for a predetermined period of time or longer, and that cancels the prohibition of the input when the detector detects the presence of the finger in the groove and the controller determines presence of a sliding of the finger in the groove.

According to the above input device, the controller prohibits the input of the finger operation to the operation surface when the finger operation by the user to the operation surface has not been performed for a predetermined period of time or longer. Accordingly, even if a user brings a finger close to the operation surface accidentally, an input for operating an image is not performed. Therefore, it is possible to prevent an input unintended by the user.

When the controller determines presence of a sliding of the finger in the groove based on the presence of the finger in the groove detected by the detector, the controller cancels the prohibition of the input. Therefore, when making the sliding movement of the finger in the groove, the user is again allowed to perform the input with the finger operation to the operation surface. In this case, the finger operation intended by the user will be performed.

BRIEF DESCRIPTION OF DRAWINGS

FIG. 9 is a drawing illustrating a displaying condition of the display screen accompanying the finger operation to a groove in the remote operation device according to the first embodiment.

FIG. 13 is a drawing illustrating a displaying condition of the display screen accompanying the finger operation to a groove in the remote operation device according to the second embodiment.

FIG. 17 is a drawing illustrating a displaying condition of the display screen accompanying the finger operation to a groove in the remote operation device according to the third embodiment.

EMBODIMENTS FOR CARRYING OUT INVENTION

Hereinafter, embodiments of the present disclosure are described based on drawings. In the following embodiments, like references are used to refer to corresponding elements and redundant description may be omitted. When a part of a configuration is explained in an embodiment, the configuration of other embodiments previously explained can be applied to other parts of the configuration concerned. Combinations of configurations are not limited to those explicitly described in respective embodiments. Other combinations, even if not explicitly illustrated, can be obtained by partially combining multiple embodiments as long as the combination does not cause impediments in particular.

(First Embodiment)

A first embodiment (FIG. 1 to FIG. 9) applies the input device of the present disclosure to a remote operation device 100 used to operate a navigation device 50. The remote operation device 100 is mounted in a vehicle, and constitutes a display system 10 in cooperation with the navigation device 50.

Figure 1:
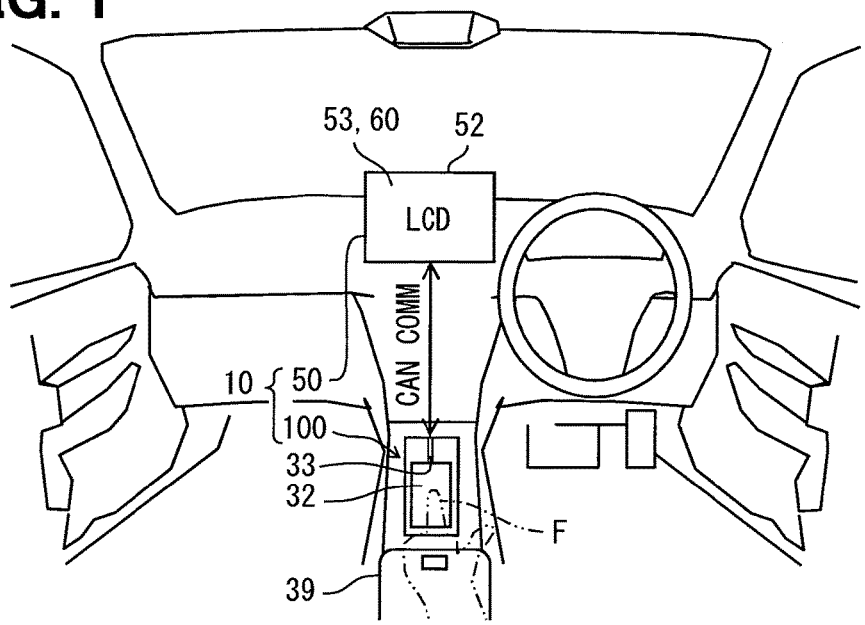
FIG. 1 is an explanatory drawing illustrating an arrangement of a navigation device and a remote operation device in a compartment according to a first embodiment.
Figure 2:
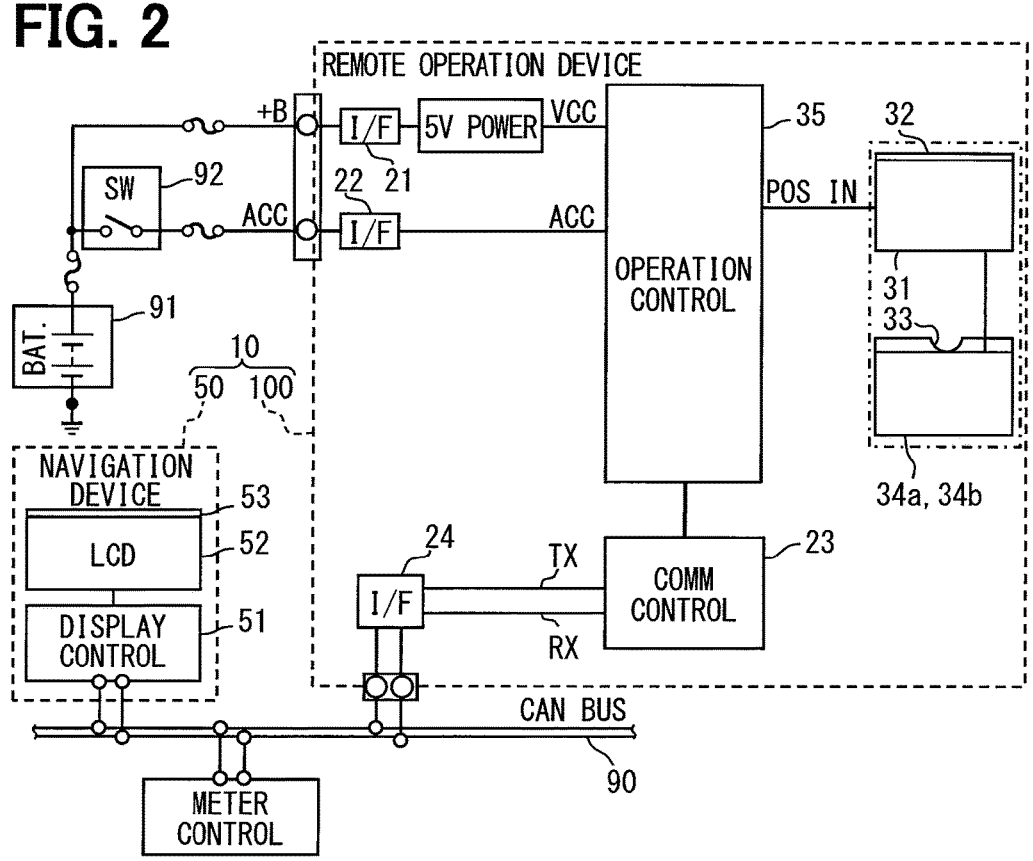
FIG. 2 is a configuration diagram illustrating a configuration of the navigation device and the remote operation device according to the first embodiment.
Figure 3:
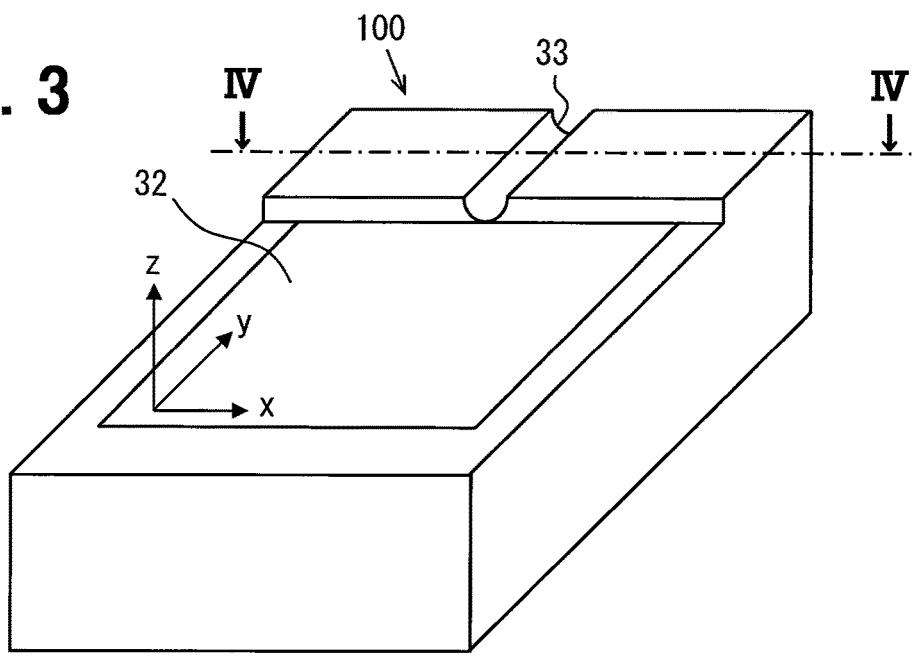
FIG. 3 is a perspective view illustrating the remote operation device according to the first embodiment.

As illustrated in FIG. 1, the remote operation device 100 is installed in a position adjoining a palm rest 39 in a center console of the vehicle, and exposes its operation surface 32 within the easy reach of an operator (it is a user and assumed as a driver here). The remote operation device 100 includes a touch sensor 31 (FIG. 2 and FIG. 3), and the surface of the touch sensor 31 provides the above-described operation surface 32 to which an operator's finger operation is performed. F in FIG. 1 refers to the operator's finger.

The navigation device 50 is installed in the center of the right and left direction (the width direction of the vehicle) of an instrument panel of the vehicle so that a display screen 53 of a liquid crystal display 52 is exposed and oriented to the driver's seat and the front passenger's seat so that it can be viewed from an operator. The display system 10 (the liquid crystal display 52) switches and displays various display images 60 on the display screen 53. The remote operation device 100 is provided separately from the navigation device 50, and is installed spaced away from the navigation device 50.

Hereinafter, configurations of the remote operation device 100 and the navigation device 50 are explained in detail with reference to FIG. 2 to FIG. 5.

The remote operation device 100 is coupled to a controller area network bus (hereinafter called a CAN bus) 90 and an external battery 91 etc. The CAN bus 90 is a transmission line employed for transmission of data among multiple in-vehicle devices in an in-vehicle communication network in which the in-vehicle devices mounted in the vehicle are connected to each other. The remote operation device 100 can communicate with the separately located navigation device 50 via the CAN bus 90.

The remote operation device 100 has s a rectangular parallelepiped box shape as a whole. The remote operation device 100 includes power source interfaces 21 and 22, a communication control unit 23, a communication interface 24, a touch sensor 31, an operation surface 32, a groove 33, a first sensor 34a, a second sensor 34b, and an operation control unit 35. The power source interfaces 21 and 22 stabilize a power supplied from the battery 91, and supply it to the operation control unit 35. The power is always supplied from the battery 91 to the power source interface 21, which is one of the power source interfaces. When an accessories (ACC) power of the vehicle is turned on and a switch 92 is accordingly set in a conductive state, the power is supplied from the battery 91 to the power source interface 22, which is the other of the power source interfaces.

The communication control unit 23 and the communication interface 24 output the information processed by the operation control unit 35 to the CAN bus 90. The communication control unit 23 and the communication interface 24 acquire the information outputted by other in-vehicle devices to the CAN bus 90. The communication control unit 23 and the communication interface 24 are coupled to each other with a transmission signal line TX and a reception signal line RX.

The touch sensor 31 is a capacitive-type detector (an example of detection means). The touch sensor 31 has a rectangular plate and detects an operation state with a finger to a sensor surface. The touch sensor 31 is arranged to correspond to the operation surface 32. In the touch sensor 31, electrodes are arranged in an x-axis direction and a y-axis direction to form a lattice. These electrodes are coupled to the operation control unit 35. Capacitance generated in each electrode changes depending on the position ((x, y, z)-coordinates of FIG. 3) of a finger approaching the sensor surface. A signal of the generated capacitance (sensitivity value) is outputted to the operation control unit 35. The sensor surface is covered with an insulation sheet made of an insulation material.

The operation surface 32 is a plane part over which an operator performs a finger operation. For example, the whole insulation sheet of the sensor surface is applied with a material which helps a smooth sliding of a finger. The operation surface 32 is rectangular and arrange in a vehicle-backward side region of the front surface of the rectangular parallelepiped shaped remote operation device 100. The input for the operation to a display image 60 (refer to FIG. 9) displayed on the display screen 53 can be made by the finger operation of the operator in the x-axis direction, the y-axis direction, or the z-axial direction over the operation surface 32.

The groove 33 is a depressed area extending in the longitudinal direction in which the user's fingertip can be inserted to make a sliding movement of the finger. The groove 33 is arranged in the vehicle-front side region of the front surface of the rectangular parallelepiped-shaped remote operation device 100. The groove 33 is arranged closer to the vehicle front than the operation surface 32 is. The groove 33 (the bottom of the groove 33) is arranged on the same plane as the operation surface 32. The longitudinal direction of the groove 33 is arranged to match the vehicle anteroposterior direction and points toward the operation surface 32. The groove 33 is arranged approximately in the center of the remote operation device 100 in the right and left direction of the vehicle.

Figure 4:
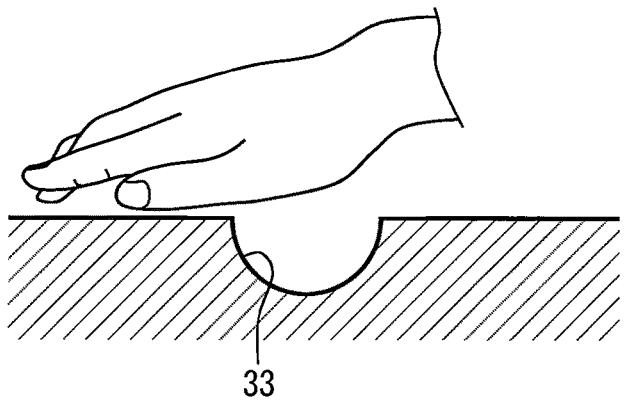
FIG. 4 is a sectional view illustrating a section along a IV-IV line in FIG. 3.

The groove 33 is a circular arc (a semicircle) in cross section and has a width comparable to a fingertip for example. Therefore, as illustrated in FIG. 4, the groove 33 is formed such that multiple fingers or a palm cannot be inserted in it.

The first sensor 34a and the second sensor 34b serve as detectors which detect the presence of a driver's finger in the groove 33. The first sensor 34a and the second sensor 34b are provided in the position corresponding to the groove 33 (a further lower part of the bottom of the groove 33). The first sensor 34a is provided in the position corresponding to one end side of the groove 33 far from the operation surface 32. The second sensor 34b is provided in the position corresponding to the other end side of the groove 33 near to the operation surface 32. The first sensor 34a corresponds to an example of a first side detector the present disclosure, and the second sensor 34b corresponds to an example of a near side detector of the present disclosure.

Figure 5:
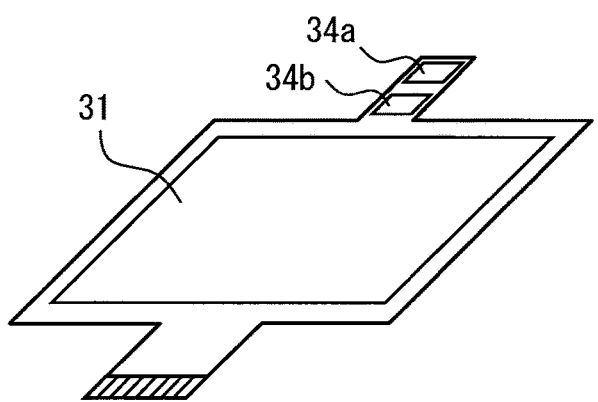
FIG. 5 is a perspective view illustrating a touch sensor and first and second sensors.

The first sensor 34a and the second sensor 34b are provided by electrodes like the touch sensor 31. As illustrated in FIG. 5, in the present embodiment. The first sensor 34a and the second sensor 34b are formed on the one end side of the touch sensor 31 integrally with the touch sensor 31. The electrodes of the first sensor 34a and the second sensor 34b are coupled to the operation control unit 35 via the touch sensor 31. The electrodes of the first sensor 34a and the second sensor 34b output, to the operation control unit 35, a capacitance signal (sensitivity value) which is generated by virtue of the change of capacitance when a finger approaches or touches the groove 33.

The operation control unit 35 corresponds to an example of the controller of the present disclosure. The operation control unit 35 includes a processor which performs various kinds of processing, a RAM which functions as workspace of the processing, and a flash memory which stores the program to be utilized for the processing. In addition, the operation control unit 35 is coupled to the power source interfaces 21 and 22, the communication control unit 23, the touch sensor 31, the first sensor 34a, and the second sensor 34b.

By running a specified program, the operation control unit 35 measures the capacitance signal of each electrode of the touch sensor 31 to acquire the sensitivity value (Hth), which is a measurement value of the touch sensor 31. When an operator's finger approaches the operation surface 32 (the sensor surface), a charge is stored between the electrode and the finger. The operation control unit 35 calculates the x coordinate, the y coordinate, and the z coordinate by the calculation processing based on the sensitivity value. The x coordinate and the y coordinate indicate the relative operation position of the finger in the direction in which the operation surface 32 spreads (hereinafter called relative position), and the z coordinate corresponds to the distance from the operation surface 32 to the finger (hereinafter called the operation distance).

Figures 6, 7:
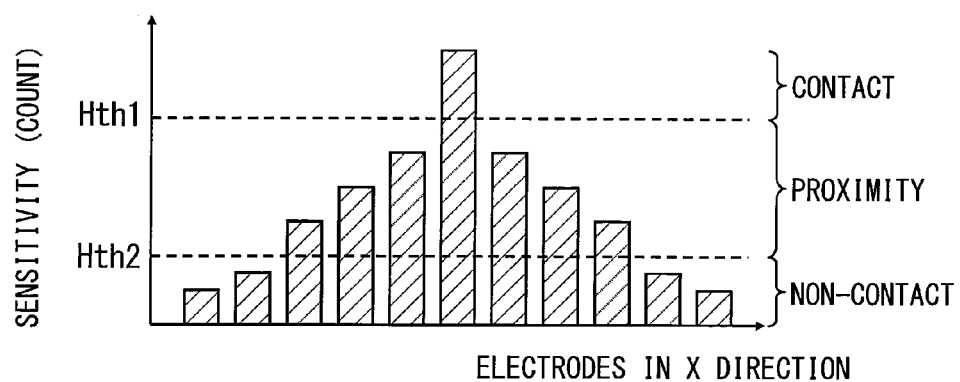
FIG. 6 is a drawing illustrating a relation between a sensitivity value detected by the touch sensor and an operation state determined by an operation control unit in the remote operation device according to the first embodiment.
FIG. 7 is a drawing illustrating a relation among a sensitivity threshold, an operation state, and a screen display, stored in the operation control unit according to the first embodiment.

Specifically, as shown in FIG. 6 for example, when a finger is placed in contact with the operation surface 32 at a position corresponding to the position of a certain electrode among the electrodes aligned in the x-axis direction, a large sensitivity value is acquired from the certain electrode. The sensitivity value acquired from an electrode distant from the finger contact position is smaller because the contact state of the finger is lost for the distant electrode. The similar characteristics are also obtained in the electrodes aligned in the y-axis direction. Therefore, the operation control unit 35 calculates the present relative position of the finger from the point (x-coordinate position, y-coordinate position) corresponding to the electrode at which the biggest sensitivity value among the electrodes in the x-axis direction and the y-axis direction is acquired.

In the z-axis direction, the sensitivity value becomes larger as the finger approaches closer the operation surface 32, and the sensitivity value becomes smaller as the finger recedes further from the operation surface 32. Therefore, the operation control unit 35 calculates the z-coordinate position of the present finger, that is, the operation distance, based on the magnitude of the sensitivity value acquired.

The operation control unit 35 associates the operation state of a finger (the operation distance of the finger in the z-axis direction) with the acquired sensitivity value, as shown in FIG. 6 and FIG. 7. The operation control unit 35 associates the below-described operation process to the display image 60 with the sensitivity value acquired. Sensitivity thresholds Hth1 and Hth2 for determining the operation state are preset in the operation control unit 35. The operation control unit 35 determines the operation state of a finger according to the sensitivity threshold. The operation state is classified into a contact state in which the finger is in contact with the operation surface 32 or the finger is out of contact actually but in almost near contact, a proximity state in which the finger is close to the operation surface 32, and a noncontact state in which the finger recedes further from the operation surface 32 than in the proximity state. The contact state may be the operation state in which a finger is substantially in contact with the operation surface 32.

For example, the sensitivity thresholds provided in the operation control unit 35 are Hht1=200 counts and Hht2=100. Then, when the sensitivity value is greater than Hth1 (200), the operation control unit 33 determines that the finger is in the contact state to the operation surface 32. When the sensitivity value is between Hth1 and Hth2 (101 to 200), the operation control unit 33 determines that the finger is in the proximity state to the operation surface 32. When the sensitivity value is equal to or smaller than Hth2 (100), the operation control unit 33 determines that the finger is in the noncontact state to the operation surface 32. Hereinafter, the contact state is simply called as contact, the proximity state as proximity, and the noncontact state as noncontact.

When a finger moves up and down delicately around each of the sensitivity thresholds Hth1 and Hth2, a reversal repetition (hunching) takes place in the determination result of the operation state by the operation control unit 35. Therefore, in the upper side of each of the sensitivity thresholds Hth1 and Hth2 (the near side of the operation surface 32), upper thresholds Hth1U and Hth2U corresponding to the positions distant by a predetermined distance are set up, respectively. In the lower side of each of the sensitivity thresholds Hth1 and Hth2 (the far side of the operation surface 32), lower thresholds Hth1D and Hth2D corresponding to the positions distant by a predetermined distance are set up, respectively. When a finger is moved from the lower side of each of the sensitivity thresholds Hth1 and Hth2 (the far side) towards the upper side (near side), the upper thresholds Hth1U and Hth2U serve as a sensitivity threshold in determining the operation state. On the contrary, when a finger is moved from the upper side of each of the sensitivity thresholds Hth1 and Hth2 (near side) towards the lower side (far side), the lower thresholds Hth1D and Hth2D serve as a sensitivity threshold in determining the operation state.

Furthermore, the operation control unit 35 detects a pressing operation (touch operation) when an operator presses down the operation surface 32 lightly with a finger. Then, the operation control unit 35 outputs the occurrence and non-occurrence of the pressing operation and the (x, y, z)-coordinates indicative of the position of the finger accompanying the slide operation of the finger to the CAN bus 90 via the communication control unit 23 and the communication interface 24.

In addition, by running a specified program, the operation control unit 35 measures the capacitance signals of electrodes of the first sensor 34a and the second sensor 34b to acquire the sensitivity values, which are the measurement values of the first sensor 34a and the second sensor 34b. When an operator's finger approaches or contacts the groove 33, a charge is stored between the electrode and the finger. When the acquired sensitivity value is greater than the predetermined value defined in advance, the operation control unit 35 determines that a finger is present in the groove 33. On the contrary, when the acquired sensitivity value is less than the predetermined value, the operation control unit 35 determines that no finger is present in the groove 33.

When both the first sensor 34a and the second sensor 34b detect the driver's finger and when the detection is made in the order of the first sensor 34a and the second sensor 34b, the operation control unit 35 determines that there is a sliding movement of the finger in the groove 33. That is, when the operation control unit 35 determines the presence of a finger from the signal of the first sensor 34a and the presence of a finger from the signal of the second sensor 34b in succession, the operation control unit 35 determines that the driver has slid the finger from the one end side (the side far from the operation surface 32) towards the other end side (the near side to the operation surface 32) of the groove 33.

The navigation device 50 includes an air-conditioning operation setup function to a vehicle air conditioner, an audio operation setting up function to a vehicle audio, and a search and browse function for variety of information by the Internet in addition to the navigation function which performs display of the current position on a map and guidance to a destination. The navigation device 50 is coupled to the CAN bus 90 so as to communicate with the remote operation device 100. The navigation device 50 includes a display control unit 51 and a liquid crystal display 52.

The above-described various functions of the navigation device 50 are indicated in below-described menu item 61 in a display image 60 of the liquid crystal display 52, as Climate (air conditioner operation), Map (map display), Destination (destination setting), Media (audio operation), and Network (Internet operation) (refer to FIG. 9).

The display control unit 51 includes a processor which performs various kinds of processing, a RAM which functions as workspace of the processing, a graphic processor which performs image drawing, and a graphic RAM which functions as workspace of the drawing. The display control unit 51 further includes a flash memory which stores the data for the processing and the drawing, a communication interface coupled to the CAN bus 90, and a video output interface which outputs the drawn image data to the liquid crystal display 52. The display control unit 51 draws the display image 60 displayed on the display screen 53 based on the information acquired from the CAN bus 90. Then, the display control unit 51 sequentially outputs the image data of the drawn display image 60 to the liquid crystal display 52 via the video output interface.

The liquid crystal display 52 is a display unit of the dot matrix system which realizes color display by controlling multiple pixels arranged on a display screen 53. The liquid crystal display 52 displays an image by writing continuously the image data acquired from the display control unit 51 successively, on the display screen 53.

The display image 60 displayed on the display screen 53 corresponds to an example of image of the present disclosure. The display image 69 is provided by images hierarchized in multiple hierarchy levels. For example, images of the first hierarchy level (specified hierarchy level) among the images of multiple hierarchy level are main images for the various functions (the navigation, the air-conditioner, the audio, the Internet, etc.) of the navigation device 50. For example, FIG. 9 illustrates the main image for the air-conditioner as one main image.

In the upper part of the display image 60, a menu 61 is displayed which includes horizontally-aligned menu items indicating classifications (names) of multiple main images. The menu 61 is always displayed in the same form even when the display image 60 is switched to an image of any hierarchy level. When an operator selects a desired item of the menu 61 by a finger operation over the operation surface 32, the corresponding main image is displayed on the display screen 53. Alternatively, when an arbitrary main image is displayed, the operator can scroll the main images sequentially to display a desired main image by performing a slide operation of a finger over the operation surface 32 instead of operating the menu 61.

Several icons 62 for operating the image are provided in the display image 60. The example of FIG. 9 illustrates a wind amount setting icon, a temperature setting icon, a dual setting icon, and a blow off mode setting icon, in the air conditioner operation. A pointer 63 can be displayed on the display image 60. The pointer 63 on the display image 60 indicates the corresponding position of a finger over the operation surface 32. For example, the pointer 63 is designed like a hand, and the index finger (fingertip) thereof indicates the position at the time of the finger operation. It is also preferable that the pointer 63 adopts an arrow as the basic design. The pointer 63 is displayed over the display image 60 when the contact state of a finger is contact or proximity.

When an operator selects a desired icon 62 with the pointer 63 by performing the slide operation of a finger over the operation surface 32, a frame-shaped focus 64 is displayed indicating that the icon 62 has been selected. Furthermore, when the finger is lightly pressed down (when a touch operation is performed) over the operation surface 32 corresponding to the position of the selected icon 62, the icon 62 is set into a confirmed state, and the display is shifted to an image of the second hierarchy, that is, an image for the operation corresponding to the confirmed icon. In this way, it possible to use various functions sequentially.

In addition, when the input by the finger operation to the operation surface 32 is prohibited by the operation control unit 35 as will be described later, the display image 60 displays lock information 65 (FIG. 9) which indicates that the input is prohibited.

Figure 8:
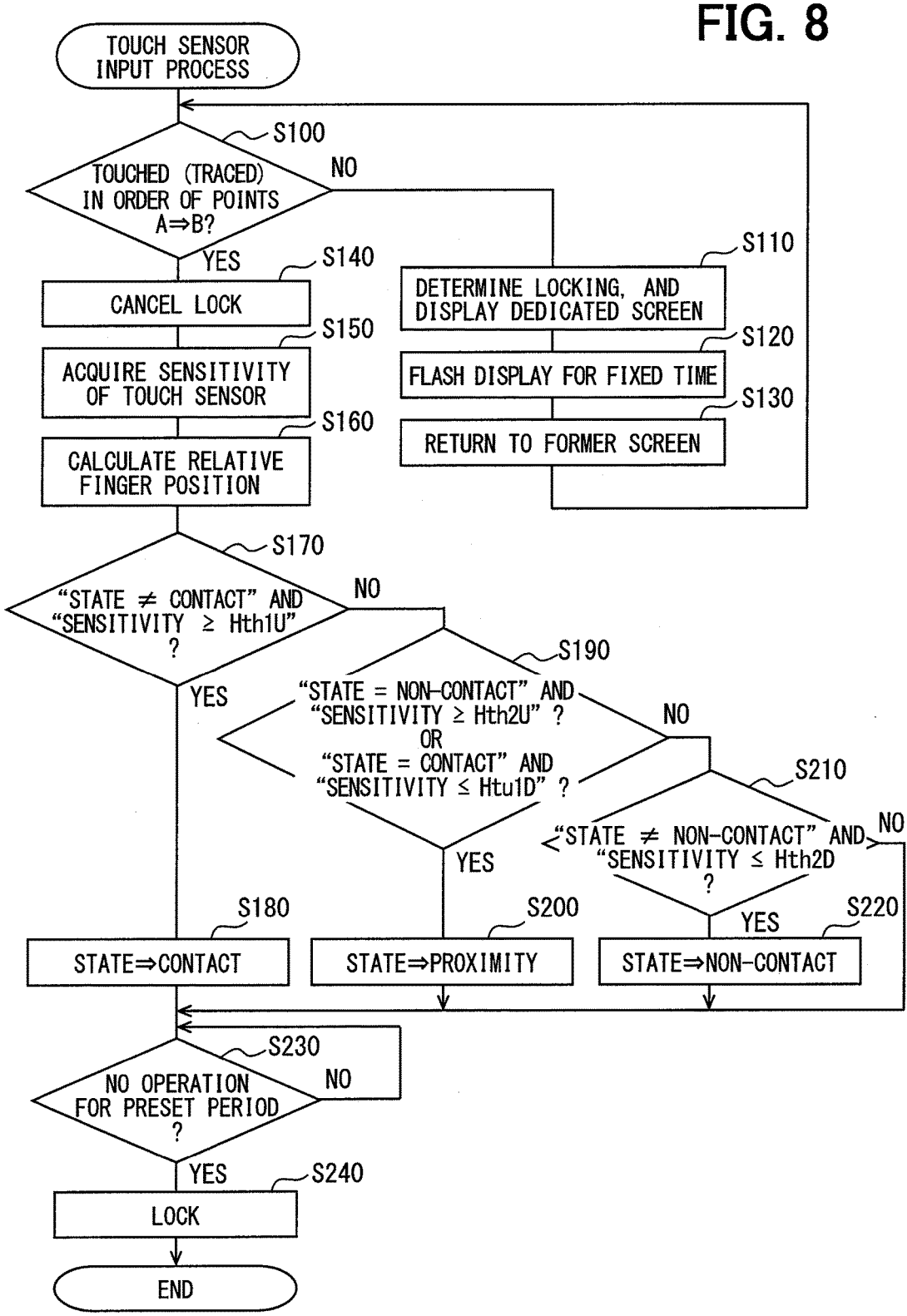
FIG. 8 is a flow chart illustrating an input process performed by the operation control unit in the remote operation device according to the first embodiment.

The following describes in details the operation control unit 35 performing the input process from the touch sensor 31, the first sensor 34a, and the second sensor 34b with reference to FIG. 8 and FIG. 9.

As illustrated in FIG. 8, at S100 at first, the operation control unit 35 determines whether the driver performs a sliding movement (tracing) of a finger from the one end side of the groove 33 (a point A of FIG. 9) towards the other end side (a point B of FIG. 9), based on the detection signals of the first sensor 34a and the second sensor 34b of the groove 33. When the sensitivity value beyond a predetermined value is acquired in order of the first sensor 34a and the second sensor 34b, the operation control unit 35 determines that a sliding movement of a finger is performed in the groove 33, otherwise, the operation control unit 35 determines that no sliding movement of a finger is performed in the groove 33.

When it is determined that no sliding movement of a finger is performed at S100, the flow advances to S110. At S110, under the assumption that the input prohibition (lock) state by the finger operation at S240 (to be described below) is continuing, the operation control unit 35 displays information notifying the locked state on the display image 60, so that this is recognized by the driver. Specifically, as shown in the left-hand side frame of FIG. 9, lock information (LOCKED) 65 is displayed on the display image 60.

Then, at S120, the operation control unit 35 highlights the lock information 65 to the driver by flashing (blinking) the lock information 65 on the display screen 60. Then, after the flashing, at S130, the display image 60 is restored to an ordinary image (the lock information 65 is erased), and the flow returns to S100.

When affirmative determination is made at S100, that is, it is determined that a sliding movement of a finger is performed, the operation control unit 35 cancels the prohibition (lock) of the input by the finger operation at S140. Accordingly, the input operation by a finger on the operation surface 32 becomes possible.

The affirmative determination made at S100 indicates a situation in which the driver has slid the finger from the point A to the point B in the groove 33; accordingly, the driver's finger has reached the area of the operation surface 32 as a natural consequence.

At S150, the operation control unit 35 performs acquisition processing to acquire the sensitivity value detected by the electrodes of the touch sensor 31, and the flow advances to S160. At S160, the operation control unit 35 performs computation of the x coordinate and the y coordinate which indicate the relative position of the finger to the operation surface 32, and the z coordinate which indicates the operation distance, from the sensitivity value acquired at S150. Then, from the calculated value of the z coordinate which indicates the operation distance, it is calculated whether the operation state of the finger is contact, proximity, or noncontact.

Specifically, when the sensitivity value detected by the touch sensor 31 is greater than Hth1 (Hth1U), the state is calculated as contact. When the sensitivity value is between Hth2 (Hth2U) and Hth1 (Hth1D), the state is calculated as proximity. When the sensitivity value is smaller than Hth2 (Hth2D), the state is calculated as noncontact.

Then, at S170, it is determined whether or not both the calculated operation state of the finger is other than contact and the sensitivity value is equal to or greater than Hth1 (actually, equal to or greater than the upper threshold Hth1U). When affirmative determination is made here, it is recognized that the operator's finger approaches the operation surface 32 from the state of noncontact or proximity and becomes the contact state to the operation surface 32; accordingly, at S180, the operation state of the finger is updated to contact.

In the state of contact, the operation control unit 35 updates the display screen 53 to a contact screen. The contact screen is a screen where the original menu 61, the icon 62, the pointer 63, and the focus 64 are displayed on the display image 60, as shown in FIG. 9 (right-hand side frame). The focus 64 indicates the current operating state (operation setup state) of the device corresponding to the main image displayed.

In the contact screen, an operator can perform original screen operation, that is, the selection and confirmation of the menu 61 and various icons 62, by the finger operation (such as sliding and a touch operation).

When negative determination is made at S170, the operation control unit 35 determines at S190 whether or not either first or second condition is satisfied. That first condition is that the operation state is noncontact and the sensitivity value is equal to or greater than Hth2 (actually equal to or greater than the upper threshold Hth2U). The second condition is the operation state is contact and the sensitivity value is equal to or smaller than Hth1 (actually equal to or smaller than the lower threshold Hth1D). When affirmative determination is made here, it is recognized that the operator's finger approaches the operation surface 32 from the state of noncontact, or the operator's finger recedes somewhat from the state of contact to the operation surface 32; accordingly, at S200, the operation state of the finger is updated to proximity.

In the state of proximity, the operation control unit 35 updates the display screen 53 to a proximity screen. The proximity screen is a screen in which the pointer 63 and the focus 64 in the above-described contact screen are not displayed. In the proximity screen, an operator can change the main image through the menu 61 by the finger operation in the state of proximity (a gesture such as a flick).

When negative determination is made at S190, the operation control unit 35 determines at S210 whether or not both the operation state is other than noncontact and the sensitivity value is equal to or smaller than Hth2 (actually equal to or smaller than the lower threshold Hth2D). When affirmative determination is made here, it is recognized that the operator's finger recedes greatly from the operation surface 32 from the state of contact or proximity; accordingly, at S220, the operation state of the finger is updated to noncontact.

In the state of noncontact, the operation control unit 35 updates the display screen 53 to a noncontact screen. The noncontact screen is a screen where the pointer 63 in the above-described contact screen is not displayed. In the noncontact screen, the focus 64 indicates the current operating state (operation setup state) of the device corresponding to the main image displayed.

In the noncontact screen, the operator's finger is separated clearly from the operation surface 32, and the operator does not have the intention to operate the display image 60, and the operator can see the display image 60 simply as a confirmation screen for confirming the current operating state of the device.

Then, when the negative determination is made at S230 following S180, S200, S220, and S210, the operation control unit 35 determines whether the state of no finger operation to the operation surface 32 by the operator has continued for a predetermined period of time or longer, based on the sensitivity value of the touch sensor 31. When affirmative determination is made at S230, the operation control unit 35 prohibits (locks) the input by the finger operation to the operation surface 32, at S240. At S230, when negative determination is made, the present S230 is repeatedly executed.

As described above, in the present embodiment, the operation control unit 35 prohibits the input by the finger operation to the operation surface 32, when the driver's finger operation to the operation surface 32 has not been performed for a predetermined period of time or longer (S240). Accordingly, even if a driver brings a finger close to the operation surface 32 carelessly, the input for operating the display image 60 is not performed. Therefore, it is possible to prevent an input unintended by the driver.

Then, when the presence of a driver's finger in the groove 33 is detected by the first sensor 34a and the second sensor 34b, the operation control unit 35 determines that the sliding movement of the finger is performed in the groove 33, and cancels the prohibition of the input (S140). Accordingly, by making a sliding movement of a finger in the groove 33, the driver is again allowed to input the finger operation to the operation surface 32. In this case, the finger operation intended by the driver will be performed.

When the operation control unit 35 determines that no sliding movement of the finger is performed in the groove 33 (the negative determination at S100), even if the finger operation to the operation surface 32 by a driver is performed while the input is prohibited (S240), the operation control unit 35 displays the lock information 65 which indicates that the input is prohibited, on the display image 60 (the liquid crystal display 52) (S110). Accordingly, the driver can clearly understand that the input operation is impossible, and the driver is not puzzled in performing the finger operation.

The detectors (the first sensor 34a and the second sensor 34b) detect the sliding movement of the finger in the groove 33. When both of the first sensor 34a and the second sensor 34b detect the presence of the driver's finger, the operation control unit 35 determines that a sliding movement of a finger is performed. According to this configuration, it is possible to enhance the detection accuracy of the sliding movement of a finger and to reduce erroneous determination.

The groove 33 is arranged on the same plane as the operation surface 32 so that the longitudinal direction of the groove 33 points to the operation surface 32. When, of the first sensor 34a and the second sensor 34b, the first sensor 34a (the point A) distant from the operation surface 32 detects the presence of the finger and then the second sensor 34b (the point B) closer to the operation surface 32 detects the presence of the finger, the operation control unit 35 determines that a sliding movement of the finger is performed. According to this configuration, the driver performs the finger operation to the operation surface 32 after sliding the finger from the point A to the point B of the groove 33; accordingly, it is possible for the driver to perform continuous operation from the groove 33 to the operation surface 32.

The first sensor 34a and the second sensor 34b in the groove 33 are formed integrally with the touch sensor 31 in the operation surface 32. According to this configuration, it is possible to easily and inexpensively provide the touch sensor 31, the first sensor 34a, and the second sensor 34b, without employing dedicated sensors for them.

Furthermore, because the groove 33 is employed as an operation unit for canceling the prohibition of an input and multiple fingers or a palm cannot be inserted into the groove 33, a wrong operation is prevented. Furthermore, by performing the slide operation of a finger along the groove 33, it is possible to perform the blind operation during driving, without looking straight at the operation surface 32 and the display screen 53 of the liquid crystal display 52.

(Second Embodiment)

A remote operation device 100A according to a second embodiment is illustrated in FIG. 10 to FIG. 13. The second embodiment is different from the first embodiment in that the second embodiment further includes an input process associated with the display image 60 and directed to both a driver in a driver's seat and a front passenger in a front passenger's seat as an operator.

Figure 10:
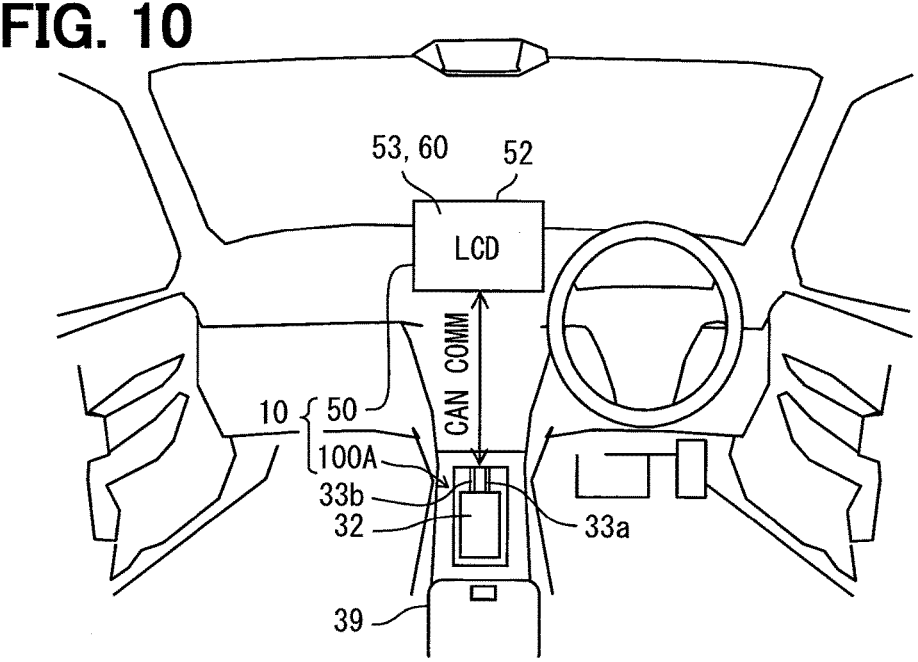
FIG. 10 is an explanatory drawing for illustrating an arrangement of a navigation device and a remote operation device according to a second embodiment in a passenger compartment.
Figure 11:
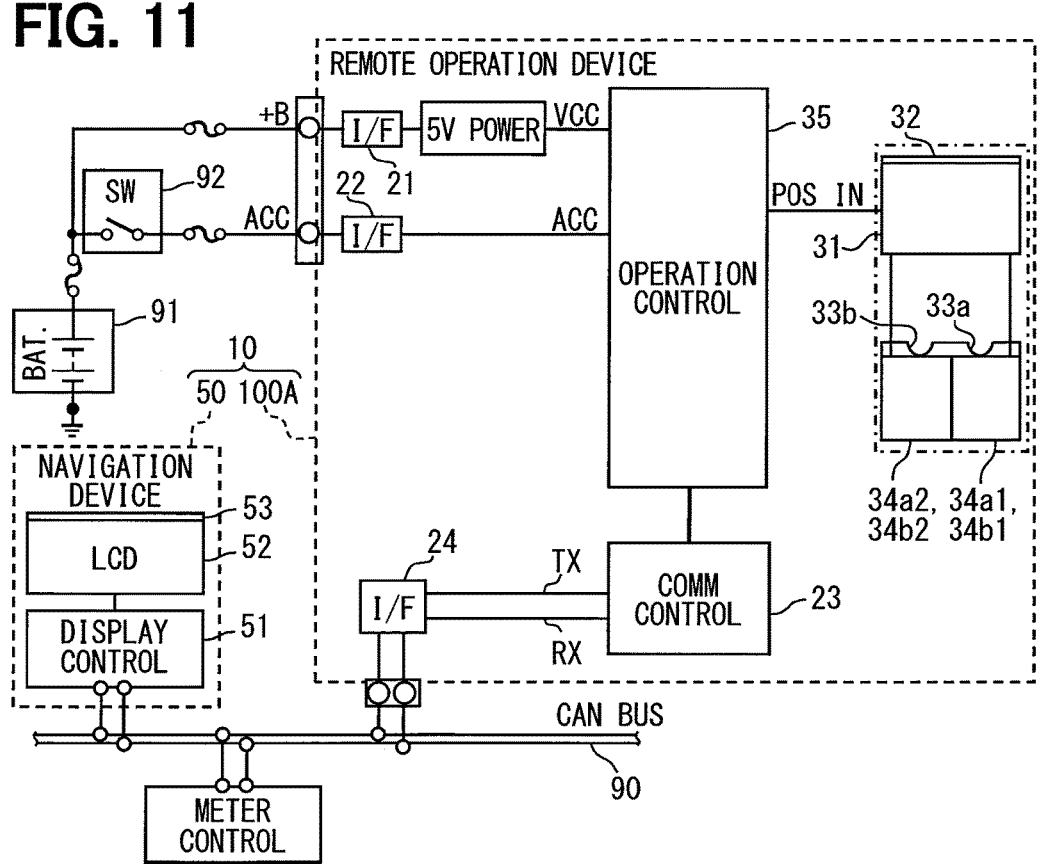
FIG. 11 is a configuration diagram illustrating a configuration of the navigation device and the remote operation device according to the second embodiment.

As illustrated in FIG. 10, FIG. 11, and FIG. 13, the remote operation device 100A is provided with multiple grooves (two grooves in the present case) formed side by side in the right-to-left direction. The two grooves are a driver's seat-specific groove 33a and a front passenger's seat-specific groove 33b.

The driver's seat-specific groove 33a is located on the driver side (right-hand side) portion of the remote operation device 100A, and is associated as a groove specific for the driver. The driver's seat-specific groove 33a is provided with a first sensor 34a1 and a second sensor 34b1, as is the case with the first embodiment. A signal detected by the first sensor 34a1 and the second sensor 34b1 is outputted to the operation control unit 35 as a signal which indicates the presence of a finger of the driver in the driver's seat-specific groove 33a.

The front passenger's seat-specific groove 33b is located on the front passenger side (left-hand side) portion of the remote operation device 100A, and is associated as a groove specific for the front passenger. The front passenger's seat-specific groove 33b is provided with a first sensor 34a2 and a second sensor 34b2, as is the case with the first embodiment. A signal detected by the first sensor 34a2 and the second sensor 34b2 is outputted to the operation control unit 35 as a signal which indicates the presence of a finger of the front passenger in the front passenger's seat-specific groove 33b.

Therefore, the operation control unit 35 can determine whether an operator to each of the grooves 33a and 33b is the driver or the front passenger, on the basis of whether the signals are from the first sensor 34a1 and the second sensor 34b1 or from the first sensor 34a2 and the second sensor 34b2.

Figure 12:
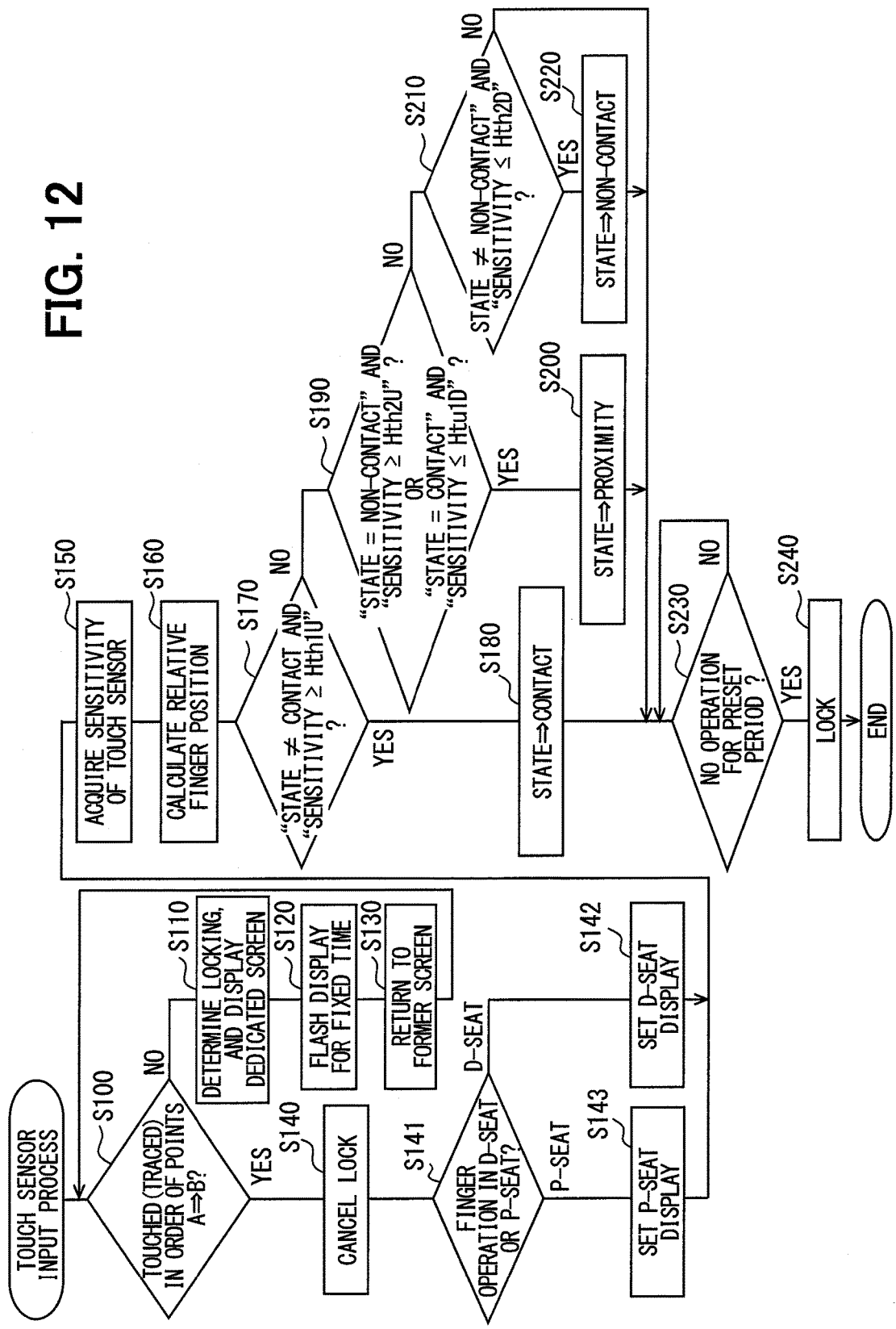
FIG. 12 is a flow chart illustrating an input process performed by the operation control unit in the remote operation device according to the second embodiment.

As illustrated in FIG. 12, the flow chart of the input process performed by the operation control unit 35 is different from the flow chart (FIG. 8) explained in the first embodiment in that S141, S142, and S143 for determining whether the operator is the driver or the front passenger and for setting up the screen display according to the determination result are added between S140 and S150.

As is the case with the first embodiment described above, first at S100, the operation control unit 35 determines whether a sliding movement of a finger of the driver or the front passenger is performed to the grooves 33a and 33b. When negative determination is made, S110 to S130 are performed. When affirmative determination is made, S140 is performed.

At S141, the operation control unit 35 determines whether the operator is the driver or the front passenger, on the basis of whether the output signals are from the first sensor 34a1 and the second sensor 34b1 or from the first sensor 34b1 and the second sensor 34b2 at S100. Specifically, when the output signals are from the first sensor 34a1 and the second sensor 34b1 and the operation control unit 35 determines that a sliding movement of a finger is performed in the driver's seat-specific groove 33a, the operation control unit 35 determines that the operator is the driver. When the output signals are from the first sensor 34a2 and the second sensor 34b2 and the operation control unit 35 determines that a sliding movement of a finger is performed in the front passenger's seat-specific groove 33b, the operation control unit 35 determines that the operator is the front passenger. In FIG. 12, D seat refers to the driver seat, and P seat refers to the front passenger seat.

When it is determined that the operator is the driver at S141, the operation control unit 35 performs the screen display setup for the driver at S142. That is, the original display image 60 is switched to a driver-dedicated image 60a. The driver-dedicated image 60a displays various icons 62, a pointer 63, and a focus 64, as illustrated in the right-hand side frame of FIG. 13. The driver-dedicated image 60a displays additionally a driver-dedicated display 60a1 instead of the menu 61, indicating that the present screen is dedicated to the driver.

In addition, the appearance shape of the driver-dedicated image 60a is changed so as to be oriented toward the driver side. That is, in the driver-dedicated image 60a, the display image 60a having the horizontally long rectangle shape in original is changed into a parallelogram shape. In the parallelogram shape, the base is shifted to the driver side (right-hand side), and the right and left edges are tilted to the driver side, from the top toward the bottom. That is, the driver-dedicated image 60a enables the driver to recognize intuitively that the original display image 60 is oriented toward the driver.

When it is determined that the operator is the front passenger at S141, the operation control unit 35 performs the screen display setup for the front passenger at S143. That is, the original display image 60 is switched to a front passenger-dedicated image 60b. The front passenger-dedicated image 60b displays various icons 62, a pointer 63, and a focus 64, as illustrated in the left-hand side frame of FIG. 13. The front passenger-dedicated image 60b displays additionally a front passenger-dedicated display 60b1 instead of the menu 61, indicating that the present screen is dedicated to the front passenger.

In addition, the shape of the front passenger-dedicated image 60b is changed so as to be oriented toward the front passenger. That is, in the front passenger-dedicated image 60b, the display image 60a having a horizontally long rectangle shape in original is changed into a parallelogram shape. In the parallelogram shape, the base is shifted to the front passenger side (left-hand side), and the right and left edges are tilted to the front passenger side from the top toward the bottom. That is, the front passenger-dedicated image 60b enables the front passenger to recognize intuitively that the original display image 60 is oriented toward the front passenger.

Then, after S142 and S143, the operation control unit 35 performs S150 to S240 as is the case with the first embodiment, performs input control according to the operation state of the operator's finger, and when the state of no finger operation has continued for a predetermined period of time or longer, the operation control unit 35 prohibits the input to the operation surface 32.

As described above, in the present embodiment, the intended operator is the driver and the front passenger; accordingly, multiple grooves are provided, that is, the driver's seat-specific groove 33a for the driver and the front passenger's seat-specific groove 33b for the front passenger are provided. The operation control unit 35 cancels the prohibition of the input to the operation surface 32 according to the finger operation to the grooves 33a and 33b. In addition, when it is determined that there has been a sliding movement of a finger in one of the grooves 33a and 33b, the operation control unit 35 switches the display image 60 to either the driver-dedicated image 60a or the front passenger-dedicated image 60b corresponding to the one of the groove 33a and the groove 33b and the operation control unit 35 displays the switched display image on the liquid crystal display 52.

According to this configuration, the operator (the driver or the front passenger) understands intuitively that the present display image 60 (the driver-dedicated image 60a or the front passenger-dedicated image 60b) is based on the input by the operator itself. Accordingly, it is definitely clear which of the driver and the front passenger is operating, and it is possible to improve the operability.

(Third Embodiment)

A remote operation device 100B according to a third embodiment is illustrated in FIG. 14 to FIG. 17. The third embodiment is different from the first embodiment in that the third embodiment is further provided with multiple grooves (a navigation-specific groove 331, an audio-specific groove 332, an air conditioner-specific groove 333) and that the third embodiment is further provided with a select function of the image (for example, multiple main images of the first hierarchy level among multiple hierarchy levels) to be displayed according to the finger operation to each groove.

Figure 14:
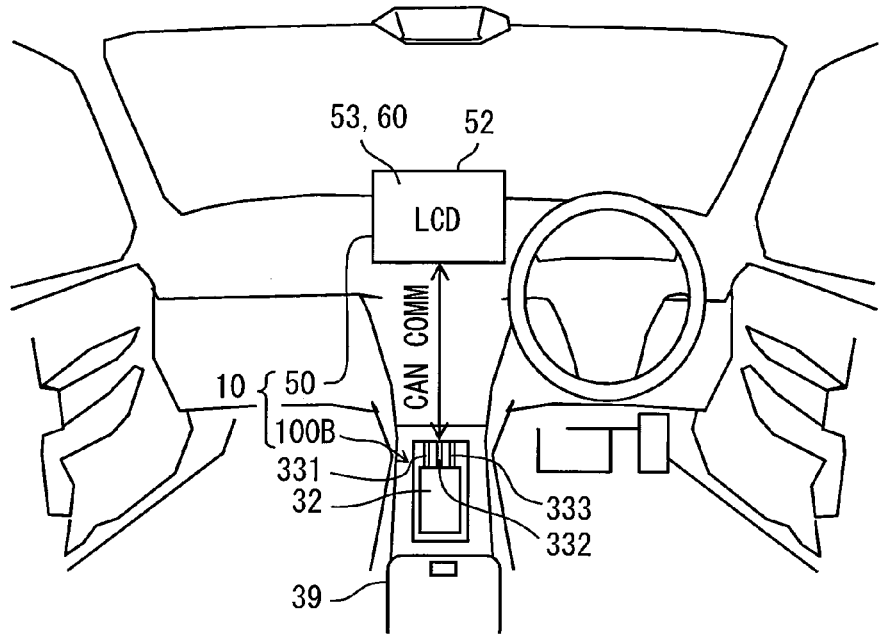
FIG. 14 is an explanatory drawing illustrating an arrangement of a navigation device and a remote operation device according to a third embodiment in a passenger compartment.
Figure 15:
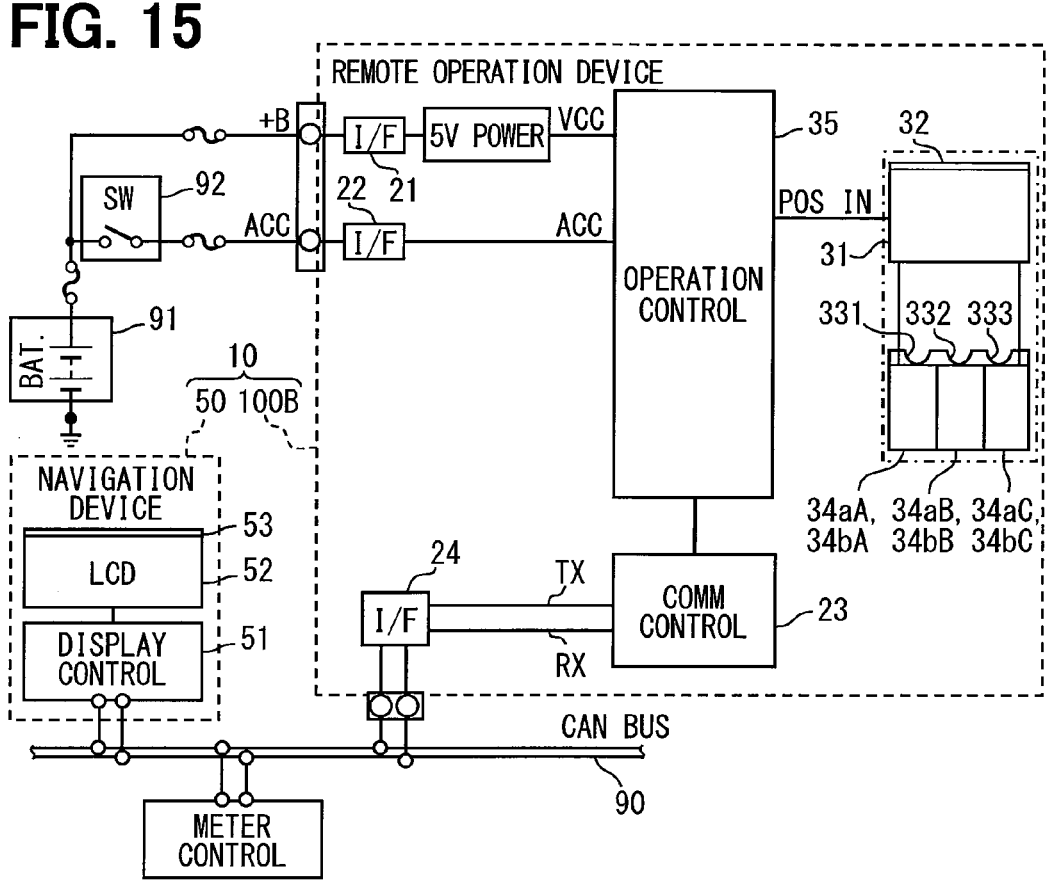
FIG. 15 is a configuration diagram illustrating a configuration of the navigation device and the remote operation device according to the third embodiment.

As illustrated in FIG. 14, FIG. 15, and FIG. 17, the remote operation device 100B is provided with multiple grooves (three grooves in the present case), that is, the navigation-specific groove 331, the audio-specific groove 332, and the air conditioner-specific groove 333, which are formed side by side in the right-to-left direction.

The navigation-specific groove 331 is located on the left-hand side portion of the remote operation device 100B, for example, and is associated as a groove for the display of the navigation screen in the first hierarchy level. As is the case with the first embodiment, the navigation-specific groove 331 is provided with the first sensor 34aA and the second sensor 34bA. Signals detected by the first sensor 34aA and the second sensor 34bA are outputted to the operation control unit 35 as a signal which indicates the presence of an operator's finger in the navigation-specific groove 331.

The audio-specific groove 332 is located on the center portion of the remote operation device 100B in the right-left direction, for example, and is associated as a groove for the display of the audio screen in the first hierarchy level. As is the case with the first embodiment, the audio-specific groove 332 is provided with the first sensor 34aB and the second sensor 34bB. Signal detected by the first sensor 34aB and the second sensor 34bB are outputted to the operation control unit 35 as a signal which indicates the presence of an operator's finger in the audio-specific groove 332.

The air conditioner-specific groove 333 is located on the right-hand side portion of the remote operation device 100B, for example, and is associated as a groove for the display of the air conditioner screen in the first hierarchy level. As is the case with the first embodiment, the air conditioner-specific groove 333 is provided with the first sensor 34aC and the second sensor 34bC. Signal detected by the first sensor 34aC and the second sensor 34bC are outputted to the operation control unit 35 as a signal which indicates the presence of an operator's finger in the air conditioner-specific groove 333.

Therefore, the operation control unit 35 can determine which groove the operator has operated (sliding movement), based on whether the signals are from the first sensor 34aA and the second sensor 34bA or the first sensor 34aB and the second sensor 34bB or the first sensor 34aC and the second sensor 34bC.

Figure 16:
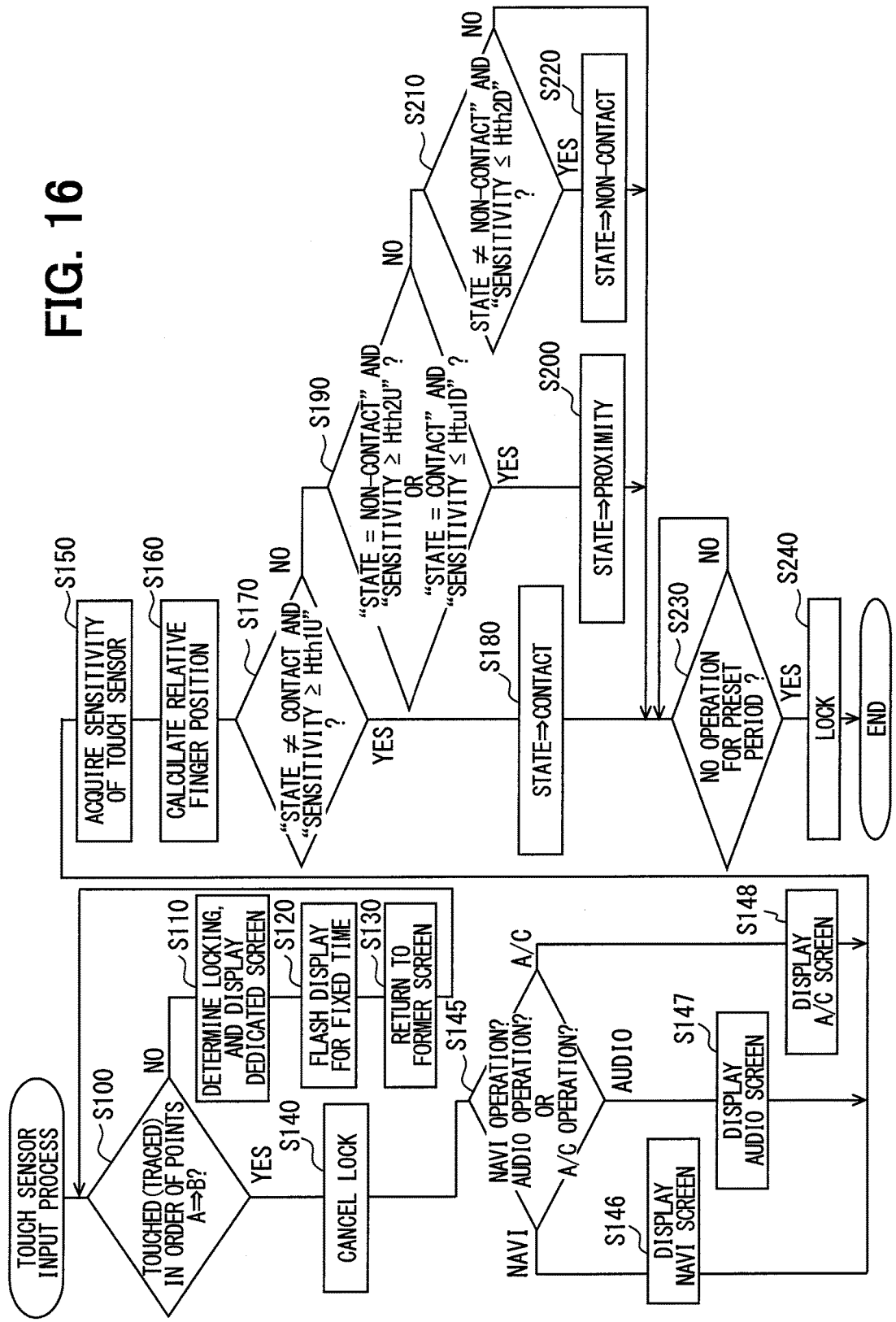
FIG. 16 is a flow chart illustrating an input process performed by the operation control unit in the remote operation device according to the third embodiment.

As illustrated in FIG. 16, the flow chart of the input process performed by the operation control unit 35 is different from the flow chart explained in the first embodiment (FIG. 8) in that S145, S146, S147, and S148 for determining which groove the operator has operated and for setting up the screen display according to the determination result are added between S140 and S150.

As is the case with the first embodiment described above, first, at S100, the operation control unit 35 determines whether a sliding movement of an operator's finger is performed to the grooves 331, 332, and 333. When negative determination is made, S110 to S130 are performed. When affirmative determination is made, S140 is performed.

Then, at S145, the operation control unit 35 determines in which groove the operator has slid a finger, based on whether the output signals are from the first sensor 34aA and the second sensor 34bB or the first sensor 34aB and the second sensor 34bB or the first sensor 34aC and the second sensor 34bC.

Specifically, the operation control unit 35 determines that a sliding movement of a finger is performed in the navigation-specific groove 331, when the output signals are from the first sensor 34aA and the second sensor 34bA. The operation control unit 35 determines that a sliding movement of a finger is performed in the audio-specific groove 332, when the output signals are from the first sensor 34aB and the second sensor 34bB. The operation control unit 35 determines that a sliding movement of a finger is performed in the air conditioner-specific groove 333, when the output signals are from the first sensor 34aC and the second sensor 34bC.

When it is determined that a sliding movement of a finger is performed in the navigation-specific groove 331 at S145, the operation control unit 35 performs the screen display setup for switching the original display image 60 to the navigation image 601 at S146. As illustrated in the left-hand side frame of FIG. 17, the navigation image 601 corresponds to the Map in the menu 61, and shows a map around the current position of the-vehicle along with the position of the vehicle on the map.

When it is determined that a sliding movement of a finger is performed in the audio-specific groove 332 at S145, the operation control unit 35 performs the screen display setup for switching the original display image 60 to the audio image 602 at S147. As illustrated in the middle frame of FIG. 17, the audio image 602 corresponds to the Media in the menu 61, and displays various icons which enable the selection of the desired audio device and the reproduction of music and videos.

When it is determined that a sliding movement of the finger is performed in the air conditioner-specific groove 333 at S145, the operation control unit 35 performs the screen display setup for switching the original display image 60 to the air conditioner image 603 at S148. The air conditioner image 603 (the right-hand side frame of FIG. 17) is the image for the air conditioner operation explained in the first embodiment and the second embodiment.

Then, after S146, S147, and S148, the operation control unit 35 performs S150 to S240 as is the case with the first embodiment, performs input control according to the operation state of the operator's finger. When the state of no finger operation has continued for a predetermined period of time or longer, the operation control unit 35 prohibits the input to the operation surface 32.

As described above, in the present embodiment, multiple grooves (the navigation-specific groove 331, the audio-specific groove 332, and the air conditioner-specific groove 333) are provided as the grooves to correspond to multiple images in the specified hierarchy level. The operation control unit 35 cancels the prohibition of the input to the operation surface 32 in response to the finger operation to each groove 331, 332, and 333. In addition, it is determined that a sliding movement of a finger is performed in one of the navigation-specific groove 331, the audio-specific groove 332 and the air conditioner-specific groove 333, the operation control unit 35 switches the display image 60 to one of the navigation image 601, the audio image 602, and the air conditioner image 603 corresponding to the one of the grooves 331, 332, and 333, and the operation control unit 35 displays the switched display image on the liquid crystal display 52.

According to this configuration, the operator can select the desired display image 60, and at the same time the operator can cancel the prohibition of the input to the operation surface 32; accordingly, it is possible to improve the operability. The operator can select the desired display image 60 by sliding one of the grooves 331, 332, and 333 with a finger. Accordingly, it is possible to the image selection by blind operation.

(Other Embodiments)

In each of the embodiments described above, after S110, the display of the lock information 65 is blinked at S120. However, if displaying the lock information 65 can attract the attention of the operator, S120 may be omitted.

The return to the usual image at S130 may be omitted. After the affirmative determination is made at S100, the return to the usual image corresponding to S130 may be performed when the prohibition of the input is canceled at S140.

Multiple sensors (the first and the second sensor) are provided for each groove. Alternatively, one sensor may be provided for one groove. In this case, the sliding movement of a finger can be performed in any direction from any end (the point A side or the point B side) of both ends of the groove. However, as is the case with each of the embodiments described above, if an operating procedure designated in advance provides that the sliding direction is from the point A to the point B, the continuous operation from the groove to the operation surface 32 becomes possible.

The operation surface 32 and each groove are provided on the same plane and the longitudinal direction of the groove points to the operation surface 32. However, this is not limiting. For example, a groove may be provided in an upper portion and may have a level difference with respect to the operation surface 32. Alternatively, a groove may be provided on a side surface of the rectangular parallelepiped remote operation devices 100, 100A, and 100B.

The first sensor, the second sensor, and the touch sensor 31 are formed integrally. Alternatively, they may be separately provided as dedicated use sensors, respectively.

The second embodiment and the third embodiment may be configured as follows. When fingers are simultaneously slid in two or more grooves of the multiple grooves, a specified inputting function may be performed (for example, a function to cancel the present input operation, to return to the immediately preceding screen, to return to the main screen of the first hierarchy, or to move to the set menu).

The touch sensor 31 of the capacitive type is employed as the detector (detection means). However, this is not limiting. Another touch sensor of pressure-sensitive type may be adopted.

A push switch may be provided in the remote operation devices 100, 100A, and 100B. This push switch may be pushed to confirm the contents (icon etc.) selected by the finger operation.

Embodiments and configurations of the present disclosure have been illustrated in the above. However, embodiments and configurations according to the present disclosure are not limited to respective embodiments and the configurations illustrated above. Embodiments and configurations which are obtained by combining suitably technical components disclosed in different embodiments and configurations are also within the scope of embodiments and configurations of the present disclosure.

The invention claimed is:

1. An input device mounted in a vehicle, separated from a display unit that switchably displays images hierarchized in a plurality of hierarchy levels, and configured to input a user's finger operation to an operation surface to operate the images, the input device comprising:
   a groove defined by a depressed area extending in a longitudinal direction of the groove to enable a user's fingertip inserted in the groove to be slid in the longitudinal direction, wherein the operation surface and a bottom of the groove are flush with each other and the longitudinal direction of the groove points to the operation surface;
   a detector that detects presence and absence of the finger in the groove; and
   a controller that determines whether or not a no-finger-operation state continues for a predetermined period of time or longer,
   wherein:
      the no-finger-operation state is a state in which there is no input of the user's finger operation to the operation surface;
      upon determining that the no-finger-operation state continues for the predetermined period of time or longer, the controller prohibits the input of the user's finger operation to the operation surface and displays lock information on the display unit indicating that the input is prohibited;
      until determining that the no-finger-operation state continues for the predetermined period of time or longer, the controller does not prohibit the input of the finger operation to the operation surface; and
      upon determining a presence of a sliding of the finger in the groove based on detection of the presence of the finger in the groove by the detector, the controller cancels the prohibition of the input to the operation surface and erases display of the lock information on the display unit.

2. The input device according to claim 1, wherein
when determining no sliding of the finger in the groove, the controller controls the display unit to display the prohibition of the input even when the finger operation is inputted to the operation surface by the user during the prohibition of the input.

3. The input device according to claim 1, wherein
a plurality of the detectors are provided in the longitudinal direction of the groove, and
the controller determines the presence of the sliding of the finger when all the detectors detect the presence of the finger.

4. The input device according to claim 3, wherein
the groove is arranged on a same plane as the operation surface, and
the controller determines the presence of the sliding of the finger when, of the plurality of detectors, one detector distant from the operation surface detects the presence of the finger and thereafter another detector closer to the operation surface detects the presence of the finger.

5. The input device according to claim 1, wherein
the operation surface is provided with a touch sensor to detect the position of the finger relative to the operation surface, and
the detectors and the touch sensor are formed integrally with each other.

6. The input device according to claim 1, wherein
the user includes a driver and a front passenger of the vehicle,
the input device is provided with a plurality of the grooves,
the plurality of grooves are associated with the driver and the front passenger, respectively, and
when the controller determines the presence of the sliding of the finger in one of the plurality of grooves, the controller displays on the display unit a dedicated image for the driver or the front passenger that corresponds to the one of the plurality of grooves.

7. The input device according to claim 1, wherein
the input device is provided with a plurality of the grooves,
the plurality of grooves, respectively, correspond to the images hierarchized in the plurality of hierarchy levels, and
when the controller determines the presence of the sliding of the finger in one of the plurality of grooves, the controller displays on the display unit the image that corresponds to the one of the plurality of grooves.

8. The input device according to claim 1, wherein the groove comprises a top disposed opposite the bottom.

9. The input device according to claim 1, wherein the input device is communicatively coupled to the display unit via a CAN bus.

* * * * *